United States Patent [19]

Park

[11] Patent Number: 5,633,850

[45] Date of Patent: May 27, 1997

[54] OPTICAL DISC PLAYER HAVING AN APPARATUS FOR TRANSFERRING BOTH A DISC TRAY AND AN OPTICAL PICKUP

[75] Inventor: Kwang-Lim Park, Seoul, Rep. of Korea

[73] Assignee: Daewoo Electronics Co., Ltd., Seoul, Rep. of Korea

[21] Appl. No.: 580,444

[22] Filed: Dec. 27, 1995

[30] Foreign Application Priority Data

Dec. 29, 1994 [KR] Rep. of Korea ............... 94-38482

[51] Int. Cl.$^6$ ............................................. G11B 17/04
[52] U.S. Cl. .................................................. 369/77.1
[58] Field of Search ................... 369/77.1, 77.2, 369/75.2, 37; 360/99.02, 99.03, 99.06, 99.07

[56] References Cited

U.S. PATENT DOCUMENTS

| | | | |
|---|---|---|---|
| 4,679,182 | 7/1987 | Kamoshita et al. | 369/77.2 |
| 4,701,901 | 10/1987 | Imai | 369/75.2 |
| 5,119,357 | 6/1992 | Tsuruta et al. | 369/75.2 |
| 5,218,592 | 6/1993 | Isshiki et al. | 369/75.2 |
| 5,251,195 | 10/1993 | Kawakami et al. | 369/75.2 |
| 5,500,844 | 3/1996 | Kim et al. | 369/77.2 |

*Primary Examiner*—Stuart S. Levy
*Assistant Examiner*—William R. Korzuch
*Attorney, Agent, or Firm*—Beveridge, DeGrandi, Weilacher & Young LLP

[57] ABSTRACT

An optical disc player for performing the backward and forward feeding operation of a tray by driving a feeding motor which controls the feeding operation of an optical pickup includes a feeding motor for generating a motive power, the optical pickup having a first rack gear at one side of the body thereof, and installed to a feeding space on a deck plate, a feeding pinion for receiving the motive power of the feeding motor by being brought into meshing engagement with the first rack gear to be rotated for permitting the optical pickup to move linearly, an auxiliary gear arbitrarily rotatable on the deck plate for being brought into meshing engagement with the first rack gear where the first rack gear reaches in a stop mode of the optical pickup, an auxiliary rack gear integrally formed with a tray for being brought into meshing engagement with the auxiliary gear, and a tray feeding gear for receiving the motive power transmitted from the feeding motor to be rotated about its position on a front upper plane of the deck plate. Thus, the player is simple in the structure, and is easy to manufacture. Also, the player is lightweight and thin.

9 Claims, 5 Drawing Sheets

OPTICAL DISC PLAYER HAVING AN APPARATUS FOR TRANSFERRING BOTH A DISC TRAY AND AN OPTICAL PICKUP

BACKGROUND OF THE INVENTION

1. Field of the Invention

The present invention relates to an optical disc player, and more particularly to an optical disc player capable of performing the backward and forward feeding operation of a tray by driving a feeding motor for controlling the feeding operation of an optical pickup in the optical disc player employing a front loading system.

2. Description of the Prior Art

An optical disc player functions by loading a disc which is capable of an optical recording onto a turntable to record a video and/or an audio signal on the disc or to reproduce the video and/or audio signal recorded on the disc. There are several systems for loading/unloading the disc into such an optical disc player, which are largely classified into a front loading system where the disc is loaded horizontally with respect to the front plane of the housing of the player and a top loading system where the disc is loaded by opening/closing an upper door of the player.

The most widely utilized system is the front loading system in which a tray carrying the disc thereon moves horizontally into the player, and then the disc is perpendicularly loaded onto the turntable.

The tray adopted to the optical disc player of the front loading system is transferred to the front of a player main body by means of a loading motor to carry the disc thereon, and the tray is transferred into the interior of the player main body to permit the disc to be mounted onto the turntable.

In contrast to a portable optical disc player of the top loading system, the optical disc player of the front loading system such as a compact disc player and a laser disc player must be equipped with the loading motor which reciprocates backward and forward with respect to the player main body for seating the disc on the turntable installed inside the player main body and for driving the tray for ejecting the disc from the turntable, in addition to being equipped with a spindle motor which rotates the disc seated on the turntable by a predetermined rpm, and to being equipped with a feeding motor which is installed to a deck plate underlying the turntable for driving an optical pickup to read out information recorded on the disc while reciprocating backward and forward in a radius direction of the disc when the disc seated on the turntable is rotated by the driving of the spindle motor.

Considerable studies have been continuously made for simplifying the complicated structure of the optical disc player to direct lightweight and thinned-down products.

For example, U.S. Pat. No. 5,434,839 issued to Choi, discloses a disc loading apparatus for performing the horizontal and vertical operation of a disc tray by means of a single motor during the loading of a disc. Also, U.S. Pat. No. 5,218,593 issued to Kaneo et al., discloses a disc loading apparatus for performing the up and down movement of a deck member and the backward and forward operation of a tray by using a single motor.

Furthermore, U.S. Pat. No. 5,084,854 issued to Ikedo et al., discloses an apparatus for simplifying motors which have been separately required for performing a disc loading mechanism that draws a disc into a player to seat the disc on the upper portion of a turntable and for maintaining an optical axis of a pickup in a perpendicular position with respect to a disc surface. U.S. Pat. No. 5,084,854 thereby attains these objects with a single motor.

Despite the number of endeavors, in the conventional optical disc player and especially in a front loading system, the separate installation of the loading motor for performing the backward and forward feeding operation of the tray and the feeding motor for controlling the feeding operation of the optical pickup demands separate transmission mechanisms added to the loading motor and feeding motor for supplying the motive power from respective motors to the tray and the optical pickup. Accordingly, the overall structure becomes complicated. Therefore, the assembling time is lengthened and productivity is defraded. Furthermore, the conventional art is disadvantageous in that the increased number of components raises cost of the product and makes the product bulky and heavy, to adversely affect the realization of the light weight and thinness.

SUMMARY OF THE INVENTION

It is an object of the present invention to provide a novel optical disc player, wherein to meet the current trend of the studies described above, a tray is transferred backward and forward by using a driving force of a feeding motor, which is installed to a deck plate underlying a turntable, for linearly moving an optical pickup installed within a feeding space on the deck plate with respect to the turntable, and an operational principle of the optical pickup moved out of the feeding space corresponding to the outermost periphery of a disc in a stop mode is used, thereby simplifying the structure, shortening an assembling time and realizing light-weight and thinned-down products.

To achieve the above object of the present invention, there is provided an optical disc player including a feeding motor for generating a motive power, and an optical pickup having a first rack gear at one side of the body thereof, and being installed to a feeding space on a deck plate. The motive power of the feeding motor is supplied to a feeding pinion brought into meshing engagement with the first rack gear to be rotated for permitting the optical pickup to move linearly. An auxiliary gear arbitrarily rotatable on the deck plate is brought into meshing engagement with the first rack gear when the optical pickup is in a stop mode, and an auxiliary rack gear integrally formed with a tray is brought into meshing engagement with the auxiliary gear. A tray feeding gear receives the motive power transmitted from the feeding motor to be rotated about its position on a front upper plane of the deck plate.

In particular, between the feeding motor and the feeding pinion, a first transmitting unit, preferably a decelerating gear group, is formed for decelerating the motive power of the feeding motor by up to a predetermined ratio to transmit the decelerated motive power to the feeding pinion. Also, a second transmitting unit, preferably a transmitting gear, is formed between the first transmitting unit and tray feeding gear for transmitting the motive power of the feeding motor to the tray feeding gear.

Furthermore, the tray feeding gear is installed at a predetermined distance away separate from the second rack gear for idling during the feeding operation and in a stop mode of the optical pickup.

Here, the distance from the tray feeding gear to second rack gear equals to or less than the length of the auxiliary rack gear.

During the backward and forward feeding operation of the tray, the feeding pinion is to be separated from the first rack gear of the optical pickup by a predetermined distance for idling.

In addition, the feeding space on the deck plate extends to the length for proceeding the feeding of the auxiliary rack gear as long as the separated distance of the second rack rear on the tray from the tray feeding gear at a place of reaching the optical pickup in the stop mode.

The optical disc player according to the present invention is for feeding the tray backward and forward by using the operational principle of the optical pickup which is moved out of the feeding space corresponding to the outermost periphery of the disc in the stop mode, which is easy to be manufactured to shorten the assembling time and realize the lightweight and thin products.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE PREFERRED EMBODIMENT

Hereinbelow, elements and an operational principle of an optical disc player according to one embodiment of the present invention will be described in detail with reference to the accompanying drawings.

Figure 1:
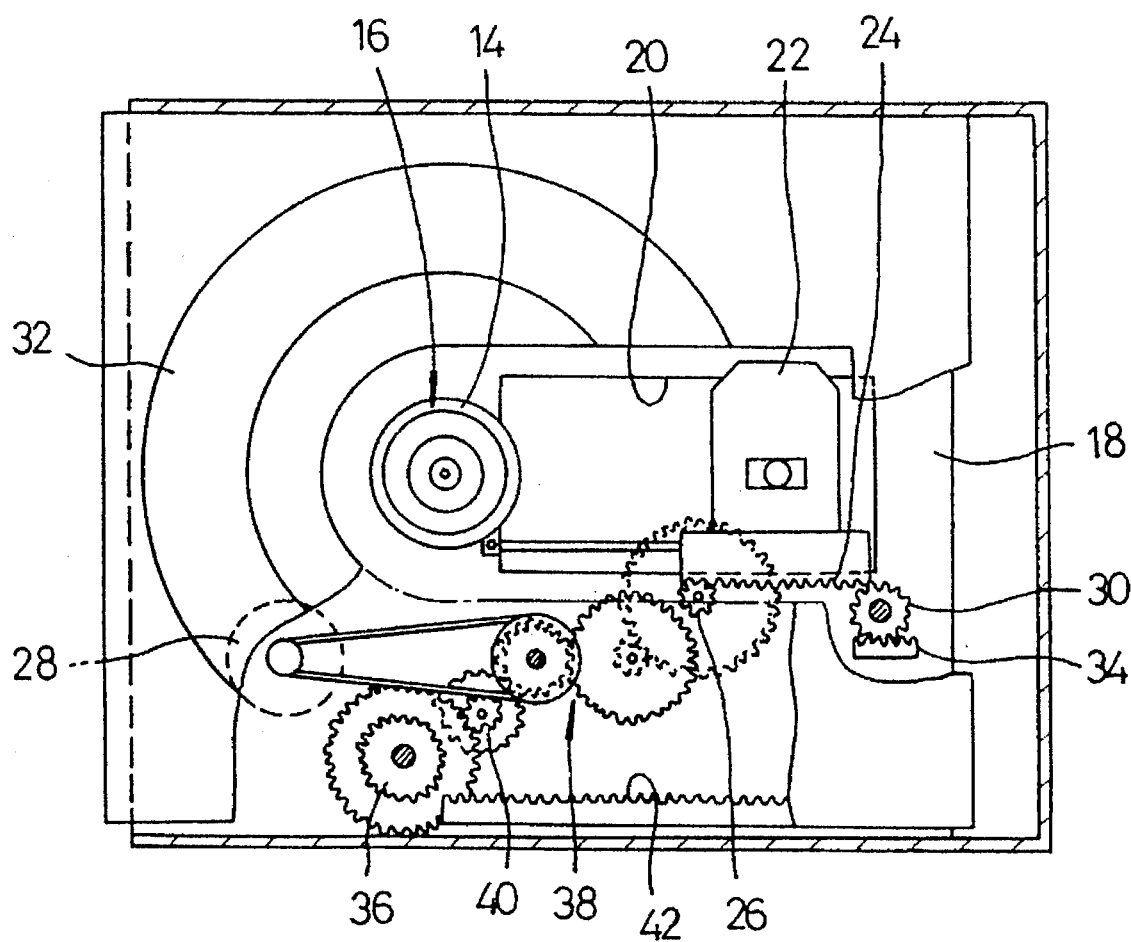
FIG. 1 is a plan view showing a partial section of an optical disc player according to the present invention.
Figure 2:
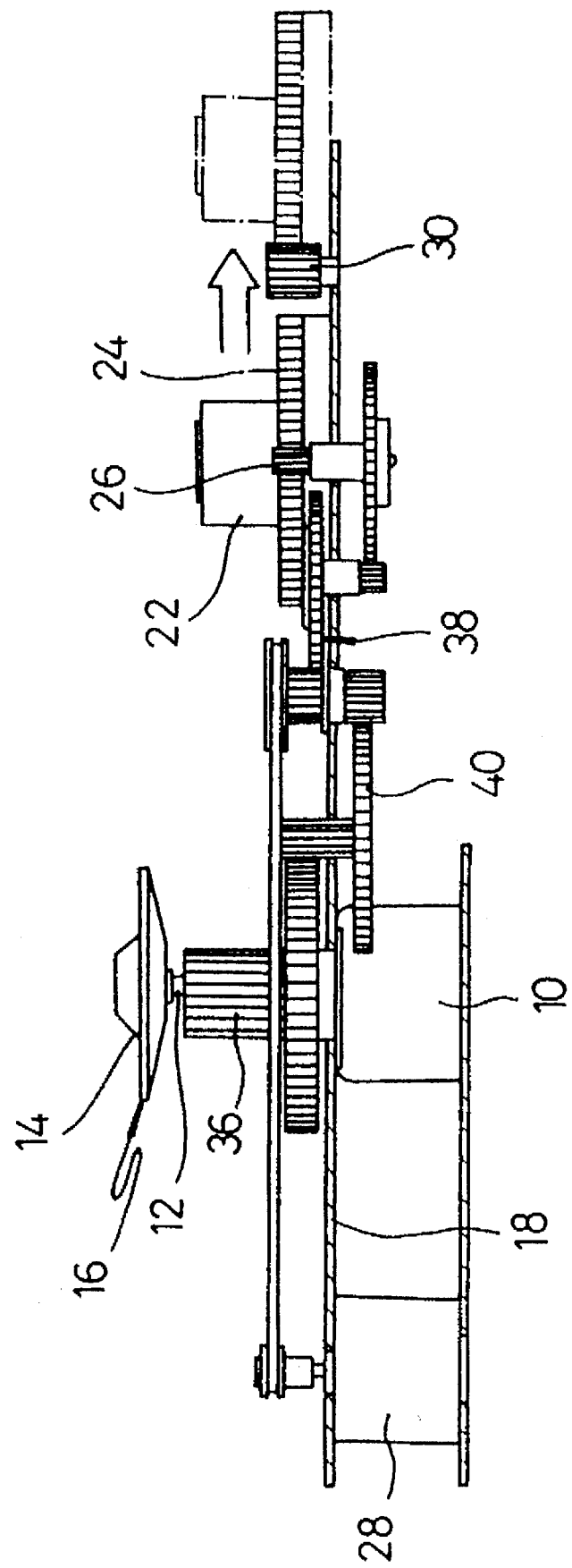
FIG. 2 is a sectional view for illustrating respective elements installed in the optical disc player according to the present invention.

FIG. 1 is a plan view showing a partial section of the optical disc player according to the present invention. FIG. 2 is a sectional view showing the installation state of the optical disc player according to the present invention.

In view of the elements, an optical pickup 22 is installed in a feeding space 20 on a deck plate 18 equipped with a spindle assembly 16 which consists of a spindle motor 10, a spindle shaft 12 and a turntable 14. A first rack gear 24 is installed at one side of the body of optical pickup 22, which is brought into meshing engagement with a feeding pinion 26.

Once a feeding motor 28 is driven and rotated in a predetermined direction, feeding pinion 26 is rotated by receiving the motive power from the rotation of feeding motor 28, with the consequence that first rack gear 24 meshed with feeding pinion 26 starts to move linearly. By this operation, optical pickup 22 integrally formed with first rack gear 24 moves linearly. An auxiliary gear 30 meshed with first rack gear 24 in optical pickup 22 is installed to be rotated on deck plate 18 where an outer end of first rack gear 24 of optical pickup 22 reaches by being transferred backward in a stop mode. An auxiliary rack gear 34 of a predetermined length to be fitted with auxiliary gear 30 is integrally formed with tray 32 in the lower plane of tray 32 to which auxiliary gear 30 is installed.

A tray feeding gear 36 is installed to one front side on the upper plane of deck plate 18 for being rotated about its position when it receives the motive power from feeding motor 28 to optical pickup 22. A second rack gear 42 integrally formed to one bottom side of tray 32 is adjacently installed to tray feeding gear 36.

In the optical disc player according to the present invention, a decelerating gear group 38 for lowering a rotational velocity of feeding motor 28 in a prescribed ratio while transmitting the motive power of feeding motor 28 to feeding pinion 26 is installed between feeding motor 28 and feeding pinion 26. A transmitting gear 40 is separately formed between decelerating gear group 38 and tray feeding gear 36.

Meantime, tray feeding gear 36 and second rack gear 42 formed to one bottom side of tray 32 are installed to be separated from each other during the feeding operation of optical pickup 22. However, when optical pickup 22 is in the stop mode, first rack gear 24 is further transferred to the outer place of feeding space 20 to be brought into meshing engagement with auxiliary gear 30. Then the resulting rotation of feeding motor 28 incites auxiliary gear 30 to be rotated about its position, so that auxiliary rack gear 34 integrally formed with tray 32 is transferred forward by a prescribed distance to forwardly transfer second rack gear 42 in tray 32 in the same distance. Consequently, second rack gear 42 and tray feeding gear 36 are brought into meshing engagement with each other.

Figure 3:
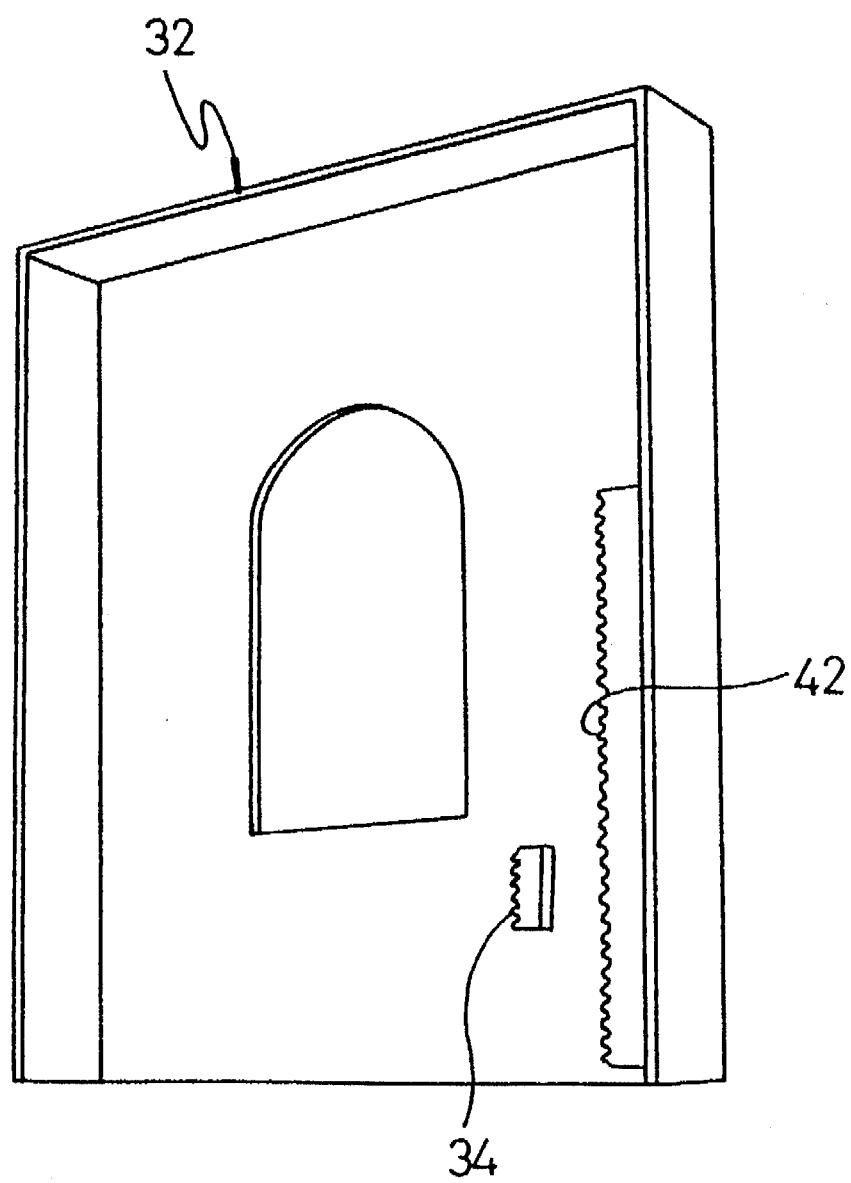
FIG. 3 is a perspective view showing the bottom of the tray in the optical disc player according to the present invention.

FIG. 3 is a perspective view showing the bottom plane of the tray applied in the present invention, in which auxiliary rack gear 34 having a predetermined length at a predetermined position is integrally formed on the bottom plane of general tray 32 formed with second rack gear 42 at one bottom side thereof.

The operational principle of the optical disc player according to the present invention constructed as above will be described with reference to FIGS. 4 and 5.

Figure 4:
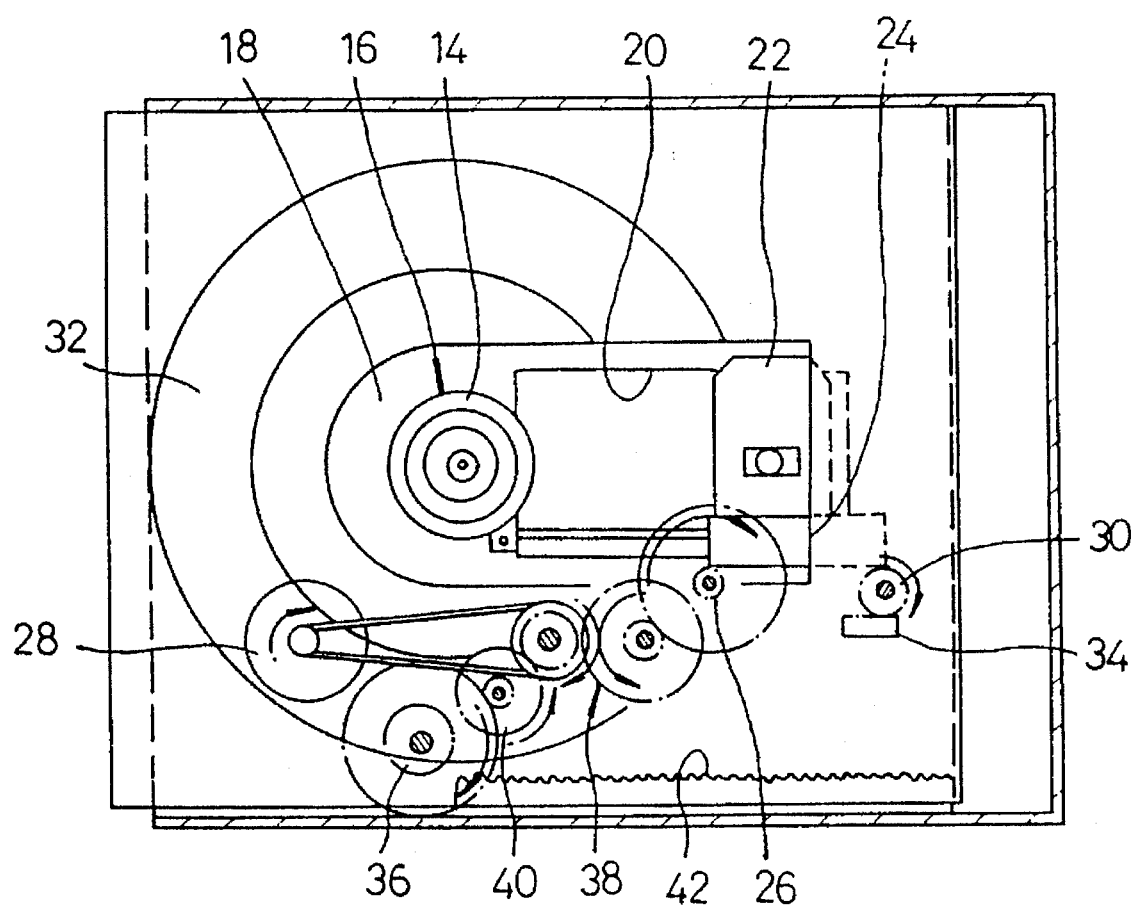
FIG. 4 is a plan view showing the initial operational state by using the optical disc player according to the present invention when the tray is delivered forward.
Figure 5:
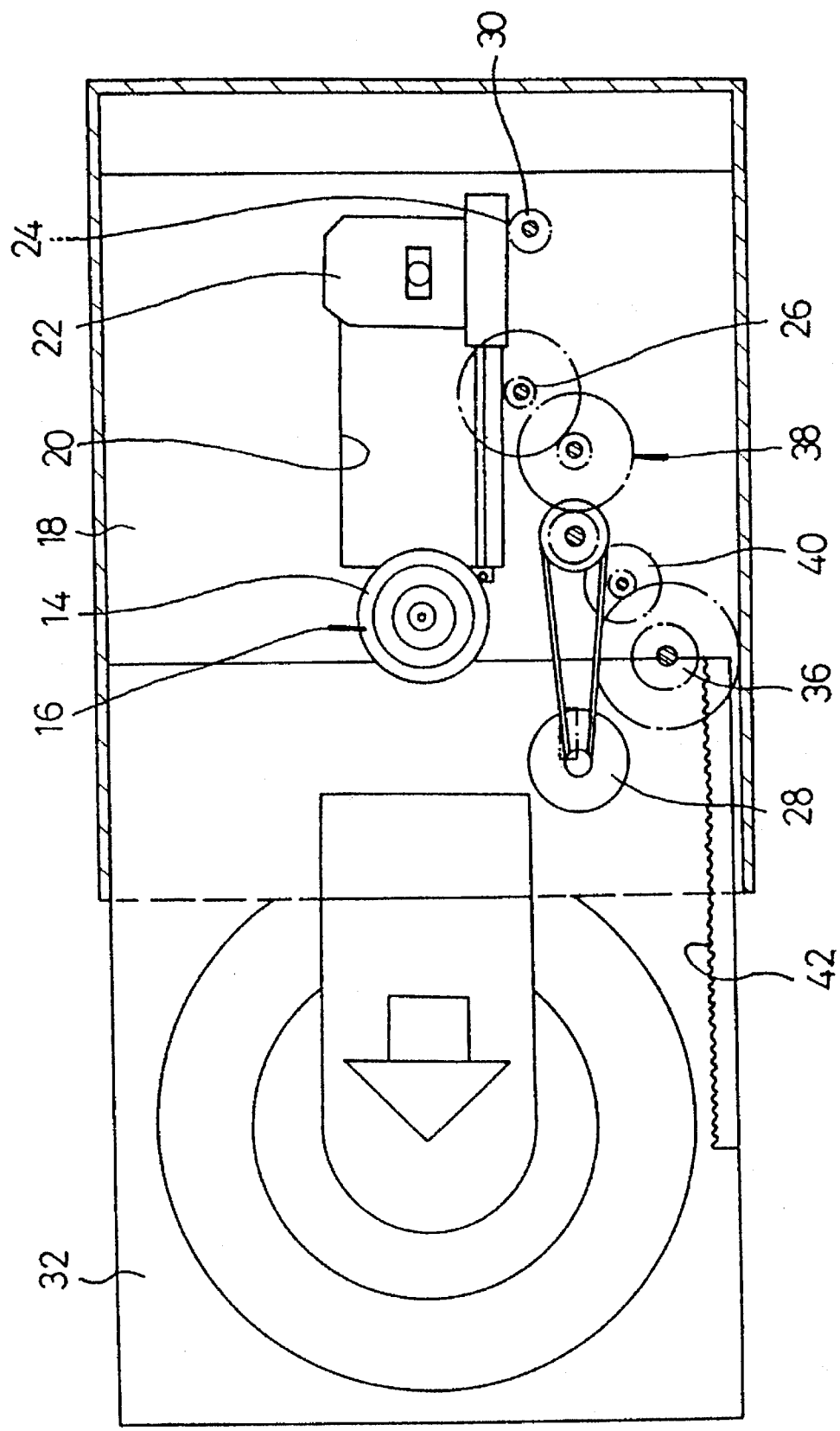
FIG. 5 is a plan view showing the state by using the optical disc player according to the present invention when the tray is completely delivered forward.

FIG. 4 is a plan view showing the initial operation state when the tray is delivered forward by using the optical disc player according to the present invention, and FIG. 5 is a plan view showing the state when the tray is completely delivered forward.

Optical pickup 22 retreats to the outer portion of feeding space 20 as shown in FIG. 1 upon a user's pressing of a stop switch, while performing the linear backward and forward reproducing operation with respect to turntable 14 by the operation of feeding motor 28, decelerating gear group 38 and feeding pinion 26 within feeding space 20 on deck plate 18. Under this state, the outer end of first rack gear 24 in optical pickup 22 is brought into meshing engagement with auxiliary gear 30 on deck plate 18.

At this time, tray feeding gear 36 installed to one front side of the upper plane of deck plate 18 stops the idling, while being separated from second rack gear 42 in the lower plane of tray 32.

When the user presses a tray open switch for exchanging a disc, as shown in FIG. 4, feeding motor 28 is rotated clockwise to be interlocked with decelerating gear group 38, feeding pinion 26 and first rack gear 24 meshed with feeding pinion 26, thereby moving optical pickup 22 further away from the outer periphery of feeding space 20. By doing so, auxiliary gear 30 having one end meshed with first rack gear 24 in optical pickup 22 and having the other end meshed with auxiliary rack gear 34 in tray 32 begins rotating. When auxiliary rack gear 34 integrally formed with tray 32 is transferred forward, overall tray 32 is moved forward by a predetermined distance to force the front end of second rack gear 42 in tray 32 to be brought into meshing engagement with tray feeding gear 36 on deck plate 18. Successively to this, the rotation of feeding motor 28 in turn rotates tray feeding gear 36 about its position to deliver tray 32 forward as shown in FIG. 5.

When transferring tray 32, first rack gear 24 in optical pickup 22 and feeding pinion 26 are released from the meshing engagement to idle feeding pinion 26, with the consequence that optical pickup 22 stays on the outermost periphery.

When the user exchanges a disc and presses the tray close switch under the state that tray 32 is in the forward position as shown in FIG. 5, feeding motor 28 is rotated counter-clockwise which is in reverse to the direction it is rotated to open the tray. By this rotation, tray feeding gear 36 meshed with second rack gear 42 in tray 32 is also rotated counter-clockwise to allow tray 32 to retreat into a player main body.

Once tray 32 is admitted into the player main body, the rear end of auxiliary rack gear 34 formed on the bottom of tray 32 is forced to be inwardly entered while being brought into meshing engagement with auxiliary gear 30 on deck plate 18. Accordingly, auxiliary gear 30 is rotated in reverse to the direction it is rotated to open the tray 32, and optical pickup 22 meshed with auxiliary gear 30 is drawn inward to feeding space 20 as much as a prescribed distance to be brought into meshing engagement with feeding pinion 26. At the same time, tray feeding gear 36 is separated from second rack gear 42 in tray 32.

During this state, if the user provides the track number for a track the user desires to be reproduced, and if the user presses a playback switch, then feeding pinion 26 is rotated by the rotative force of feeding motor 28. Following this rotation, optical pickup 22 moves linearly along the input track to read out information recorded on the disc at the corresponding place.

As described above, the operational principle of the optical pickup which is moved to a space extending from the feeding space of the optical pickup corresponding to the outermost periphery of the disc in the stop mode is applied to use the feeding motor solely, thereby enabling the backward and forward linear movement of the optical pickup and the backward and forward linear movement of the tray.

By adopting the present invention as described above, the feeding motor for the optical pickup can transfer the tray as well as the optical pickup, so a motor for transferring the tray and the corresponding motive power transmission mechanism can be excluded. As a result, the overall structure of the product is simplified and the assembling time thereof is shortened to enhance the productivity, thereby incurring low manufacturing cost and realizing the lightweight and thin products.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical disc player comprising:
   a feeding motor for generating a motive power;
   an optical pickup having a first rack gear at a side of a body thereof, and being installed to a feeding space on a deck plate;
   a feeding pinion for receiving the motive power of said feeding motor by being brought into meshing engagement with said first rack gear to be rotated for permitting said optical pickup to move linearly;
   an auxiliary gear rotatable on said deck plate for being brought into meshing engagement with said first rack gear when said optical pickup is in a stop mode to separate the first rack gear from the feeding pinion;
   a tray feeding gear for receiving the motive power transmitted from said feeding motor to be rotated about its position on a front upper plane of said deck plate;
   a tray having a second rack gear integrally formed at a side of said tray for being brought into meshing engagement with said tray feeding gear when said first rack gear is separated from said feeding pinion; and
   an auxiliary rack gear integrally formed with said tray for being brought into meshing engagement with said auxiliary gear,
   wherein said tray moves forward or backward by said auxiliary rack gear being meshed with said auxiliary gear,
   said tray moving forward for said tray feeding gear to be brought into meshing engagement with said second rack gear and said feeding pinion to be separated from said first rack gear by a predetermined distance for idling during a feeding operation of the tray while the optical pickup is in a stop mode;
   or said tray moving backward for said feeding pinion to be brought into meshing engagement with said first rack gear and for said tray feeding gear so as to be separated from said second rack gear by a predetermined distance for idling during the linear movement of the optical pickup.

2. An optical disc player as claimed in claim 1, further comprising first transmitting means for decelerating the motive power of said feeding motor by up to a predetermined ratio to transmit the decelerated motive power to said feeding pinion, said first transmitting means being provided between said feeding motor and said feeding pinion.

3. An optical disc player as claimed in claim 2, wherein said first transmitting means is a decelerating gear group.

4. An optical disc player as claimed in claim 2, further comprising second transmitting means for transmitting the motive power of said feeding motor to said tray feeding gear, said second transmitting means being provided between said first transmitting means and said tray feeding gear.

5. An optical disc player as claimed in claim 4, wherein said second transmitting means is a transmitting gear.

6. An optical disc player as claimed in claim 1, wherein the predetermined distance from said tray feeding gear to said second rack gear is no longer than a length of said auxiliary rack gear.

7. An optical disc player as claimed in claim 1, wherein the feeding space on said deck plate extends by as long as a predetermined length by extending from a place where said optical pickup reaches the stop mode, the predetermined length being no shorter than the distance of separating said tray feeding gear from said second rack gear during the linear movement of the optical pickup.

8. An optical disc player comprising:
   a feeding motor for generating a motive power;
   an optical pickup having a first rack gear at a side of a body thereof, and being installed to a feeding space on a deck plate;
   a feeding pinion for receiving the motive power of said feeding motor by being brought into meshing engagement with said first rack gear to be rotated for permitting said optical pickup to move linearly;
   a decelerating gear group between said feeding motor and said feeding pinion for decelerating said motive power of said feeding motor by as much as a predetermined ratio to transmit the decelerated motive power to said feeding pinion;

an auxiliary gear arbitrarily rotatable on said deck plate for being brought into meshing engagement with said first rack gear when said first rack gear reaches a stop mode of said optical pickup to separate the first rack gear from the feeding pinion;

an auxiliary rack gear integrally formed with a tray for being brought into meshing engagement with said auxiliary gear;

a tray feeding gear for receiving the motive power transmitted from said feeding motor to be rotated about its position on a front upper plane of said deck plate;

a transmitting gear between said decelerating gear group and said tray feeding gear for transmitting the motive power of said feeding motor to said tray feeding gear; and a tray having a second rack gear integrally formed at a side of a bottom of said tray and meshing with said tray feeding gear, said tray carrying out a feeding operation by the rotation of said tray feeding gear, wherein the feeding space on said deck plate is extended by a predetermined length by extending from a place where said pickup reaches the stop mode, wherein the predetermined length is no shorter than the distance separating said tray feeding gear from said second rack gear during the linear movement of the optical pickup, and wherein said tray moves forward or backward by said auxiliary rack gear being meshed with said auxiliary gear, for said tray feeding gear to be brought into meshing engagement with said second rack gear, or for said feeding pinion to be brought into meshing engagement with said first rack gear said tray feeding gear is installed to be separated from said second rack gear by a predetermined distance for idling during the linear movement of said optical pickup, and said feeding pinion is installed to be separated from said first rack gear by a predetermined distance during the feeding operation of said tray for idling said feeding pinion.

9. An optical disc player as claimed in claim 8, wherein the predetermined distance from said tray feeding gear to said second rack gear is no longer than a length of said auxiliary rack gear.

* * * * *